(12) United States Patent
Bobo et al.

(10) Patent No.: US 9,447,906 B2
(45) Date of Patent: Sep. 20, 2016

(54) SELF-LOCKING PUSH-TO-CONNECT INSERT

(71) Applicant: NIBCO Inc., Elkhart, IN (US)

(72) Inventors: David Bobo, Granger, IN (US); James LaFortune, Elkhart, IN (US); Derek Oldsen, Bristol, IN (US); Paul Frische-Mouri, Osceola, IN (US); Robert B. Kelsey, Granger, IN (US); Ken Rinkenberg, Goshen, IN (US)

(73) Assignee: NIBCO Inc., Elkhart, IN (US)

( * ) Notice: Subject to any disclaimer, the term of this patent is extended or adjusted under 35 U.S.C. 154(b) by 86 days.

(21) Appl. No.: 14/564,293

(22) Filed: Dec. 9, 2014

(65) Prior Publication Data

US 2015/0159792 A1 Jun. 11, 2015

Related U.S. Application Data

(60) Provisional application No. 61/914,533, filed on Dec. 11, 2013.

(51) Int. Cl.
*F16L 37/091* (2006.01)
(52) U.S. Cl.
CPC .......... *F16L 37/091* (2013.01); *F16L 37/0915* (2016.05)
(58) Field of Classification Search
CPC .................................................... F16L 37/091
USPC ....................................................... 285/340
See application file for complete search history.

(56) References Cited

U.S. PATENT DOCUMENTS

| 2,005,056 A | 6/1935 | Stephens |
| 2,201,372 A | 5/1940 | Miller |
| 2,459,251 A | 1/1949 | Stillwagon |
| 2,475,741 A | 7/1949 | Goeller |

(Continued)

FOREIGN PATENT DOCUMENTS

| EP | 0528079 | 2/1993 |
| FR | 2394736 | 1/1979 |

(Continued)

OTHER PUBLICATIONS 3 pages of photographs of prior art commercial fittings Jul. 14, 2008.

(Continued)

*Primary Examiner* — David E Bochna
(74) *Attorney, Agent, or Firm* — Price Heneveld LLP

(57) ABSTRACT

A universal self-locking push-to-connect plumbing insert assembly provides flexibility to an installer to use the assembly in the field with a variety of different plumbing fittings for coupling conduits to such fittings. The assembly comprises first and second interlocking cartridges holding a dual function gripping ring. The gripping ring has inwardly projecting tines for gripping and holding a fluid conduit and outwardly projecting tines for holding the assembly within a plumbing fitting. A sealing ring is captively held by the first cartridge and is positioned to seal the insert assembly to a plumbing fitting when inserted therein and also seal a conduit extended into the assembly. In one embodiment, the assembly further includes a release ring held within the second cartridge for selectively engaging the inwardly projecting tines of the gripping ring to allow a fluid conduit to be removed from the insert assembly.

32 Claims, 4 Drawing Sheets

(56) References Cited

U.S. PATENT DOCUMENTS

| | | | |
|---|---|---|---|
| 2,484,192 A | 10/1949 | Squiller | |
| 2,491,004 A | 12/1949 | Graham | |
| 2,831,711 A | 4/1958 | Leadbetter | |
| 2,950,132 A | 8/1960 | Kocsuta | |
| 3,116,078 A | 12/1963 | Scherer | |
| 3,204,988 A | 9/1965 | Ouderkirk et al. | |
| 3,312,483 A | 4/1967 | Leadbetter et al. | |
| 3,380,765 A | 4/1968 | Himmel | |
| 3,409,314 A | 11/1968 | Roe | |
| 3,453,006 A | 7/1969 | Levake | |
| 3,477,750 A | 11/1969 | Powell | |
| 3,603,619 A | 9/1971 | Bengesser et al. | |
| 3,837,687 A | 9/1974 | Leonard | |
| 3,874,709 A | 4/1975 | MacDonald | |
| 3,884,508 A | 5/1975 | Jones | |
| 3,909,046 A | 9/1975 | Legris | |
| 3,915,480 A | 10/1975 | Kish et al. | |
| 3,920,270 A | 11/1975 | Babb, Jr. | |
| 3,924,877 A | 12/1975 | Leopold, Jr. et al. | |
| 4,043,576 A | 8/1977 | Reich et al. | |
| 4,073,514 A * | 2/1978 | Pate | F16L 37/091 285/340 |
| 4,084,843 A | 4/1978 | Gassert | |
| 4,123,090 A | 10/1978 | Kotsakis et al. | |
| 4,138,146 A | 2/1979 | Rumble | |
| 4,163,573 A | 8/1979 | Yano | |
| 4,564,221 A | 1/1986 | Ishii | |
| 4,586,734 A | 5/1986 | Grenier | |
| 4,593,943 A | 6/1986 | Hama et al. | |
| 4,613,172 A | 9/1986 | Schattmaier | |
| 4,637,636 A | 1/1987 | Guest | |
| 4,664,427 A | 5/1987 | Johnston | |
| 4,747,626 A | 5/1988 | Hama et al. | |
| 4,919,457 A | 4/1990 | Moretti | |
| 4,993,755 A | 2/1991 | Johnston | |
| 5,029,908 A | 7/1991 | Belisaire | |
| 5,039,141 A | 8/1991 | Badoureaux | |
| 5,096,235 A | 3/1992 | Oetiker | |
| 5,108,134 A | 4/1992 | Irwin | |
| 5,160,179 A | 11/1992 | Takagi | |
| 5,301,408 A | 4/1994 | Berman et al. | |
| 5,328,215 A | 7/1994 | Grenier | |
| 5,370,423 A | 12/1994 | Guest | |
| 5,443,289 A | 8/1995 | Guest | |
| 5,466,019 A | 11/1995 | Komolrochanaporn | |
| 5,490,694 A | 2/1996 | Shumway | |
| 5,496,073 A | 3/1996 | Grenier | |
| 5,511,830 A | 4/1996 | Olson et al. | |
| 5,553,901 A | 9/1996 | Serot | |
| 5,603,530 A * | 2/1997 | Guest | F16L 37/091 285/340 |
| 5,673,945 A | 10/1997 | Olson | |
| 5,769,462 A | 6/1998 | Angell | |
| 5,813,705 A | 9/1998 | Dole | |
| 5,885,450 A | 3/1999 | Reid | |
| 5,911,443 A | 6/1999 | Le Quere | |
| 5,911,446 A | 6/1999 | McLennan et al. | |
| 5,934,712 A | 8/1999 | Friedrich et al. | |
| 6,039,361 A | 3/2000 | Meli | |
| 6,056,326 A | 5/2000 | Guest | |
| 6,065,779 A | 5/2000 | Moner et al. | |
| 6,174,002 B1 | 1/2001 | Rho | |
| 6,231,090 B1 | 5/2001 | Fukao et al. | |
| 6,447,019 B1 | 9/2002 | Hosono et al. | |
| 6,464,266 B1 | 10/2002 | O'Neill et al. | |
| 6,488,318 B1 | 12/2002 | Shim | |
| 6,517,124 B2 | 2/2003 | Le Quere | |
| 6,641,178 B2 | 11/2003 | Gowing | |
| 6,663,145 B1 | 12/2003 | Lyall, III et al. | |
| 6,685,230 B1 | 2/2004 | Bottura | |
| 6,805,385 B2 | 10/2004 | Viegener | |
| 6,880,865 B2 | 4/2005 | Guest | |
| RE38,786 E | 8/2005 | Guest | |
| 6,929,289 B1 | 8/2005 | Guest | |
| 6,957,833 B2 | 10/2005 | Guest | |
| 7,032,932 B2 | 4/2006 | Guest | |
| 7,063,359 B2 | 6/2006 | Vallee | |
| 7,100,948 B2 | 9/2006 | Guest | |
| 7,316,429 B2 | 1/2008 | Viegener | |
| 7,341,286 B2 * | 3/2008 | Andre | F16L 37/091 285/340 |
| 7,354,079 B2 | 4/2008 | Rehder et al. | |
| 7,410,193 B2 | 8/2008 | Guest | |
| 7,425,022 B2 | 9/2008 | Guest | |
| 7,448,654 B2 | 11/2008 | Le Quere | |
| 7,497,483 B2 | 3/2009 | Williams et al. | |
| 7,533,907 B2 | 5/2009 | Swift et al. | |
| 7,621,569 B2 | 11/2009 | Anthoine | |
| 7,862,089 B2 | 1/2011 | Crompton | |
| 8,205,915 B1 | 6/2012 | Crompton et al. | |
| 8,210,576 B2 | 7/2012 | Crompton | |
| 8,398,122 B2 | 3/2013 | Crompton et al. | |
| 8,480,134 B2 | 7/2013 | Crompton et al. | |
| 8,585,100 B2 | 11/2013 | Stults et al. | |
| 8,608,205 B2 | 12/2013 | Lai | |
| 2002/0109353 A1 | 8/2002 | Guest | |
| 2003/0057701 A1 * | 3/2003 | Koo | F16L 37/091 285/340 |
| 2003/0071460 A1 * | 4/2003 | Snyder, Sr. | F16L 37/091 285/340 |
| 2004/0070198 A1 | 4/2004 | Rohrig | |
| 2007/0075542 A1 | 4/2007 | Glaze et al. | |
| 2009/0278346 A1 * | 11/2009 | O'Brien | F16L 37/091 285/23 |
| 2010/0171302 A1 | 7/2010 | Yoder | |
| 2010/0253064 A1 | 10/2010 | Le Quere | |
| 2011/0088790 A1 * | 4/2011 | Schutte | F16L 37/091 137/315.11 |
| 2011/0089684 A1 * | 4/2011 | Schutte | F16L 37/091 285/305 |
| 2015/0240980 A1 * | 8/2015 | Bobo | F16L 37/091 285/321 |

FOREIGN PATENT DOCUMENTS

| | | |
|---|---|---|
| FR | 2689205 | 10/1993 |
| GB | 1520742 | 8/1978 |
| GB | 2167147 | 5/1988 |

OTHER PUBLICATIONS

Patent Cooperation Treaty Search Report and Written Opinion for PCT/US2014/069544 dated Apr. 16, 2015.

* cited by examiner

SELF-LOCKING PUSH-TO-CONNECT INSERT

CROSS-REFERENCE TO RELATED APPLICATIONS

This application claims priority under 35 U.S.C. §119(e) and the benefit of U.S. Provisional Application No. 61/914,533 entitled SELF-LOCKING PUSH-TO-CONNECT ASSEMBLY, filed on Dec. 11, 2013, by David Bobo, et al., the entire disclosure of which is incorporated herein by reference.

BACKGROUND OF THE INVENTION

The present invention relates to an assembly for inserting into a first plumbing fitting to allow the push-to-connect coupling of another conduit or fitting to the first plumbing fitting.

There have been numerous proposals for push-to-connect plumbing fittings which eliminate the need for additional labor steps in providing a connection of a fluid conduit to the fitting. With push-to-connect fittings, typically no soldering is necessary nor is crimping required. One such proposal is disclosed in U.S. Publication 2010/0171302 published on Jul. 8, 2010. Push-to-connect fittings may require a separate tool for the removal of a fluid conduit from the fitting once assembled and, in some cases, integrally includes a release ring for such purpose. Nearly all of the push-to-connect fittings employ a gripping ring made of a metal, such as stainless steel, with tines that extend inwardly and engage and hold a fluid conduit inserted into the fitting. Also, the fittings typically include at least one O-ring providing a fluid-tight seal for the connection.

Most push-to-connect fittings are preassembled to a particular fitting requiring the installer to have the necessary fitting available when completing a plumbing system. It would be desirable to allow the installer to convert existing conventional fittings to push-to-connect fittings in the field.

SUMMARY OF THE INVENTION

A universal self-locking push-to-connect plumbing assembly provides flexibility to an installer to use the assembly in the field with a variety of different plumbing fittings for allowing push-to-connect coupling of conduits to such fittings. The assembly comprises first and second interlocking cartridges between which there is held a dual function gripping ring. The gripping ring has inwardly projecting tines for gripping and holding a fluid conduit and outwardly projecting tines for holding the assembly within a plumbing fitting. In one embodiment, the assembly further includes a release ring held within the second cartridge for selectively engaging the inwardly projecting tines of the gripping ring to allow a fluid conduit to be removed from the assembly. A sealing ring is captively held by the first cartridge and is positioned to seal the assembly to a plumbing fitting when inserted therein and also to seal a conduit extended into the assembly.

In a preferred embodiment, the insert includes a generally cylindrical first cartridge which has annularly spaced apertures that extend axially and radially for lockably receiving aligned locking tabs of the second cartridge. The second generally cylindrical cartridge is positioned to engage a gripping ring positioned between the first and second cartridges. The gripping ring includes a flat washer shaped body having inwardly and outwardly extending tines projecting from inner and outer edges of the body. The washer-shaped body includes apertures aligned with the apertures of the first cartridge, such that the locking tabs of the second cartridge can extend through the body of the gripping ring and hold it in place between the first and second cartridges. A dual functioning sealing ring is attached to an end surface of the first cartridge to sealably engage a fitting into which the insert is installed as well as providing a seal for a conduit held to the insert by the gripping ring.

The interlocked first and second cartridges can be integrally molded of a polymeric material and are easy to assemble with the gripping ring and sealing ring, resulting in an insert assembly which can subsequently be used by an installer, which is self-locking to a plumbing fitting, and can be used for coupling conduits to a variety of plumbing fittings. In one embodiment, the assembly further includes a release ring held within the second cartridge for selectively engaging the inwardly projecting tines of the gripping ring to allow a fluid conduit to be removed such that no separate tool is necessary to disconnect a fluid conduit from the assembly.

These and other features, objects and advantages of the present invention will become apparent upon reading the following description thereof together with reference to the accompanying drawings.

DETAILED DESCRIPTION OF THE PREFERRED EMBODIMENT

Figure 1:
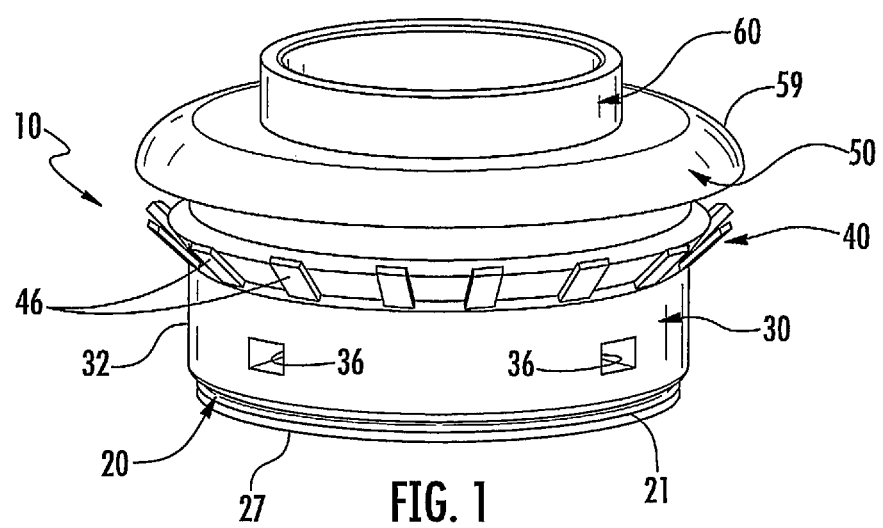
FIG. 1 is a perspective view of a preassembled self-locking push-to-connect insert assembly which can be used in the field to provide push-to-connect plumbing fittings.
Figure 2:
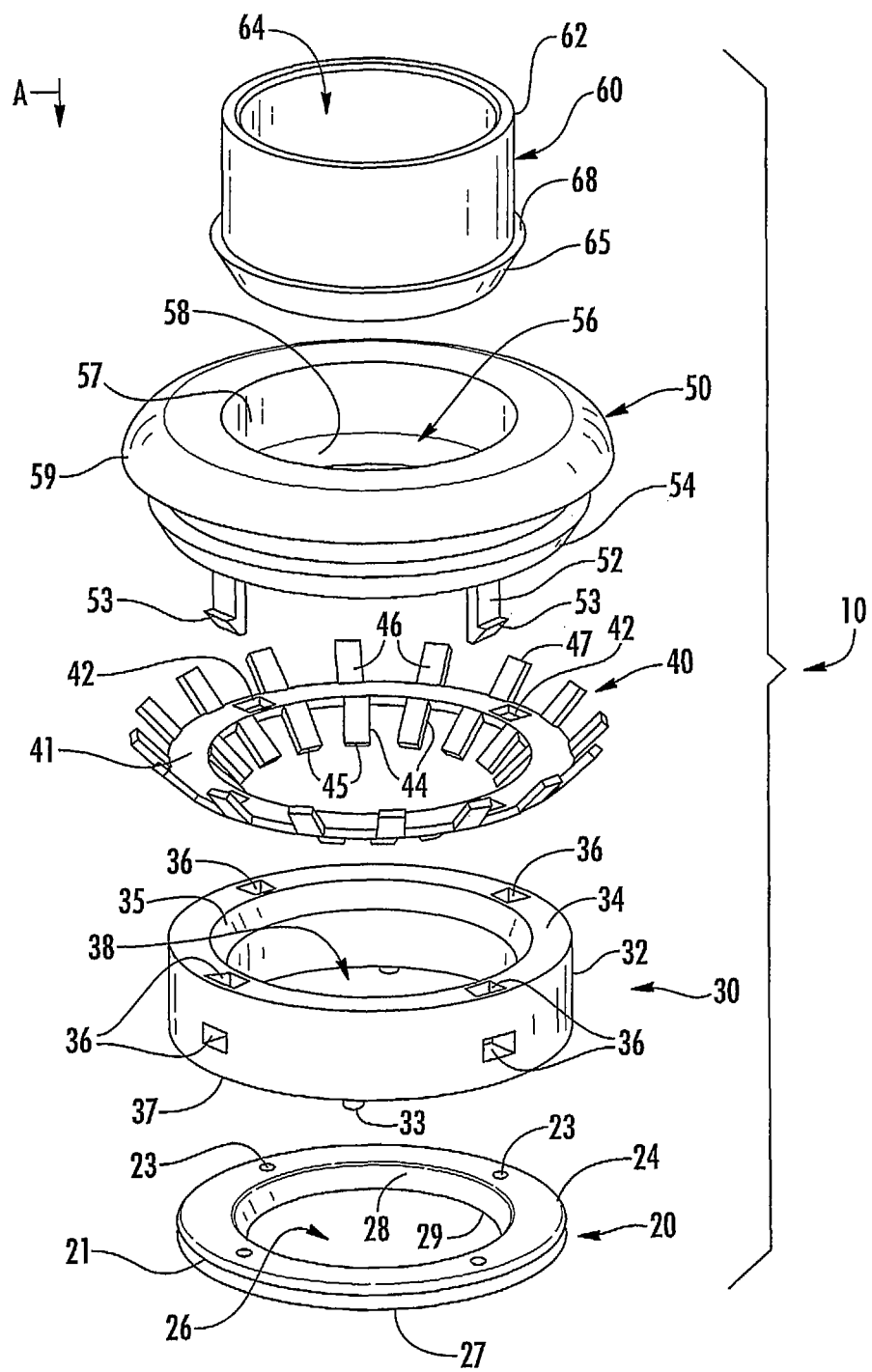
FIG. 2 is an exploded perspective view of the components of the insert assembly shown in FIG. 1.
Figure 3:
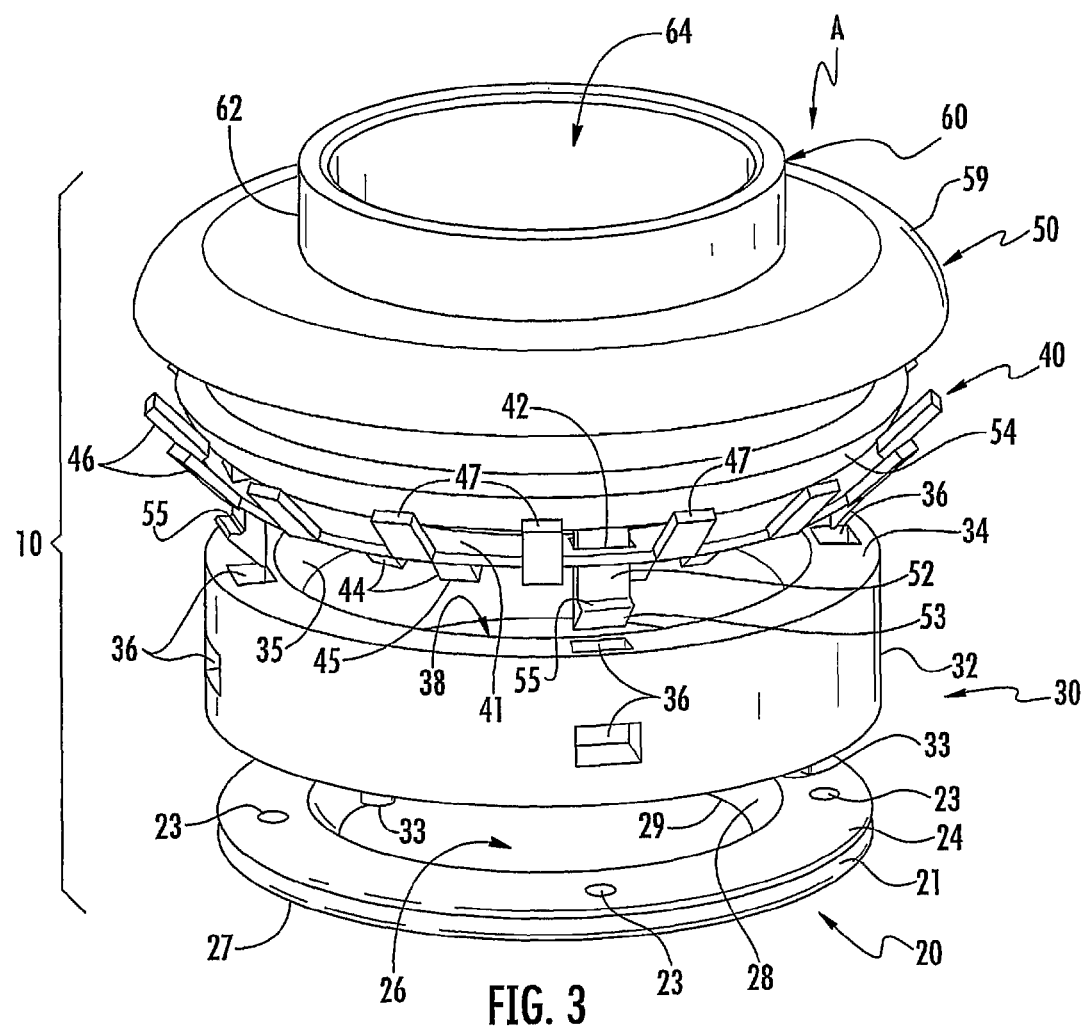
FIG. 3 is an enlarged exploded, partly assembled view of the insert assembly shown in FIGS. 1 and 2.

Referring initially to FIGS. 1-3, there is shown a self-locking push-to-connect insert assembly 10 embodying the present invention. Assembly 10, as best seen in FIGS. 2 and 3, comprises a dual functioning ring seal 20 positioned below and attached to the lower surface 37 of a first cartridge 30. Above the first cartridge is a dual functioning gripping ring 40. Gripping ring 40 is sandwiched between the first cartridge and a second cartridge 50, which, in the preferred embodiment, receives a release ring 60, as shown in the assembled view of FIG. 1.

Figure 4:
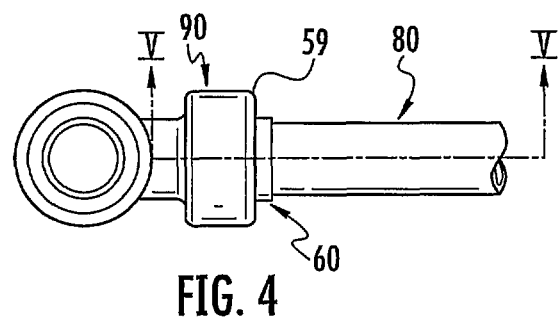
FIG. 4 is a top plan view of a plumbing fitting and conduit coupled thereto using the insert assembly shown in FIGS. 1-3.
Figure 5:
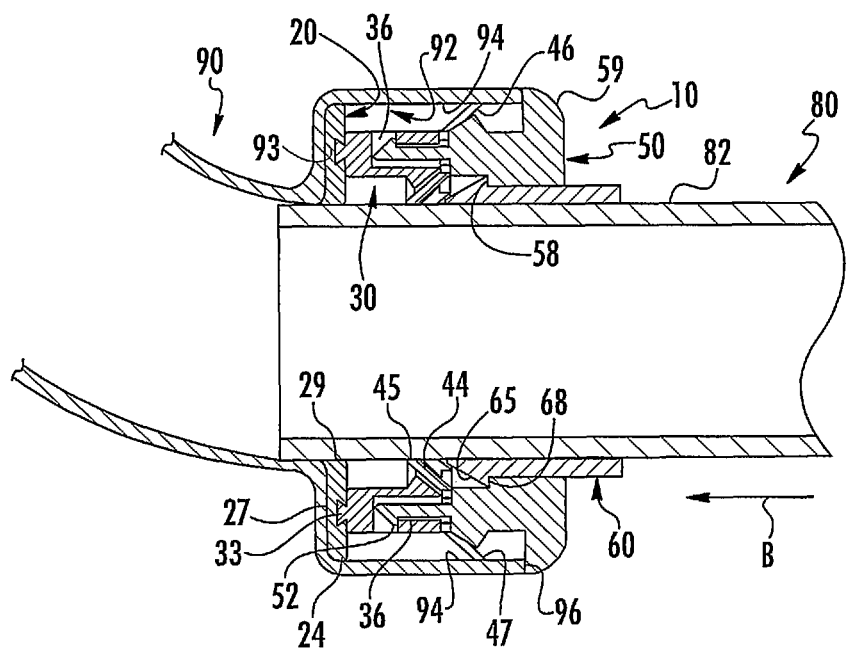
FIG. 5 is an enlarged fragmentary cross-sectional view of the structure shown in FIG. 4, taken along section lines V-V of FIG. 4.

The first cartridge 30 comprises a generally cylindrical member having an outer wall 32, a top annular surface 34, and a bottom annular surface 37. A plurality of axially and radially extending apertures 36 spaced at approximately 90° intervals extend partially downwardly through the surface 34 of wall 32 and outwardly through the side. Apertures 36 lockably receive locking tabs 52 of the second cartridge 50, as discussed below. The first cartridge 30 includes a central cylindrical opening 38 with a beveled seat 35 conforming to the angle of the inwardly extending tines 44 of gripping ring 40, as discussed below. The first cartridge 30 further includes downwardly projecting tabs 33, which extend within depressions 23 of an annular or washer-shaped ring seal 20. As best seen in FIG. 3, the annular seal 20 has a generally cylindrical outer edge 24 with an annular indentation 21 providing compressibility for the ring seal 20. The tabs 33 of cartridge 30 engage and index the ring seal 20 with respect to the first cartridge 30 and hold the ring seal in place prior to the insertion of assembly 10 into a plumbing fitting, as illustrated in FIGS. 4 and 5. Ring seal 20 has a circular central opening 26 with a beveled edge 28 defining a flexible edge 29 with a diameter to sealably engage the outer cylindrical wall of a conduit, such as conduit 80 (FIG. 5), when inserted into assembly 10. Seal 20 is made of a suitable elastomeric material typically employed in seals for fluid fittings.

The gripping ring 40 includes a generally washer-shaped body 41, as best seen in FIG. 2, having apertures 42 therein aligned with and dimensioned to receive tabs 52 of the second cartridge and align also with apertures 36 in the first cartridge 30 such that, as illustrated in FIGS. 1 and 5, the gripping ring 40 is sandwiched between the first cartridge 30 and the second cartridge 50 with the tabs 52 extending through the washer-shaped body 41 of the gripping ring 40, as illustrated in FIG. 3. Gripping ring 40 includes inwardly and downwardly extending annularly spaced tines 44 with tips 45 which grip a conduit inserted therein, holding the conduit in place, as illustrated in FIG. 5. Gripping ring 40 also includes upwardly and outwardly extending tines 46 for lockably inserting assembly 10 into the socket end 92 of a plumbing fitting 90, as also illustrated in FIG. 5 discussed below. The tines 44 project inwardly and downwardly at an angle of about 45° and have a length sufficient such that tips 45 dig into the outer wall of a conduit, such as conduit 80, as seen in FIG. 5. The angle of beveled surface 35 of first cartridge 30 is selected to allow the tines 44 to flex somewhat during insertion of a conduit 80, thereby allowing the easy insertion of a conduit within insert assembly 10.

The upwardly and outwardly extending tines 46 of gripping ring 40 extend outwardly at an angle of about 45° and have tips 47 which and are positioned in slightly spaced relationship to a beveled lower annular surface 54 (FIGS. 2 and 3) of second cartridge 50. Thus, the tines 46 can flex inwardly a distance sufficient to enter and lockably engage the inner cylindrical surface 94 of a plumbing fitting 90 when the insert assembly 10 is inserted into the fitting, as shown in FIGS. 4 and 5.

The second cartridge 50 includes downwardly extending locking tabs 52 having arrowhead-shaped heads 53, which extend through apertures 42 in gripping ring 40 (FIG. 3) and through apertures 36 in the first cartridge. The heads of the tabs 52 include a locking surface 55 (FIG. 3) extending outwardly through the radially extending portion of apertures 36. The tabs 52 are dimensioned to snap-lock the first and second cartridges together, as illustrated in FIG. 1, with the gripping ring 40 interlocked and sandwiched therebetween.

The second cartridge 50 includes a central aperture 56 for receiving the conduit 80 and a release ring 60. Within the inner cylindrical side wall 57 of the second cartridge 50 is an annular shoulder 58 (FIGS. 2 and 5) which is engaged by a locking surface 68 (FIG. 2) at the top of a tapered surface 65 of release ring 60, as best seen in FIG. 5. The tapered surface 65 engages tines 44 of the gripping ring 40 when the release ring is pushed downwardly in the direction indicated by arrow A in FIGS. 2 and 3 to deflect tines 44 outwardly, such that the tips 45 disengage the outer wall 82 of conduit 80, allowing the conduit to be removed from the insert assembly 10. The release ring 60 includes a generally cylindrical body 62 with a central aperture 64 for receiving conduit 80. The upper surface of second cartridge 50 has a curved shoulder 59 and a diameter generally conforming to the size of the plumbing fitting into which the assembly 10 is mounted, as best seen in FIGS. 4 and 5.

Assembly 10 is manufactured, as illustrated in FIG. 3, by inserting the release ring 60 into locking engagement with the second cartridge 50. The tabs 52 of the second cartridge are then extended through the apertures 42 of gripping ring 40. Then, the locking tabs 52 of the second cartridge are inserted further downwardly through the axially and radially extending apertures 36 of the first cartridge until the locking tab heads 53 snap radially outwardly through the radial extensions of apertures 36, thereby locking the first and second cartridges together with the gripping ring 40 held therebetween. Finally, the ring seal 20 is pressed onto the tabs 33 of the first cartridge, holding the entire assembly together, as seen in FIG. 1, for subsequent use with any type of plumbing fitting for which insert assembly 10 is dimensioned to fit.

FIGS. 4 and 5 illustrate the use of insert assembly 10 for coupling a conduit 80 to a plumbing fitting 90. Fitting 90 is illustrated as an elbow, although it can be any form of pipe fitting, such as a T, a coupling, a valve, or other plumbing fitting in which a conduit is to be sealably coupled. Fitting 90 includes an enlarged cylindrical end socket 92 having an inner cylindrical side wall 94 into which assembly 10 is mounted prior to insertion of conduit 80. When fully inserted as illustrated in FIG. 5, the lower surface 27 of ring seal 20 is compressed against the annular end wall 93 of socket 92 and the outer edge 24 of ring seal 20 engages inner surface 94 of the socket 92 to seal the connection of insert assembly 10 to fitting 90. The inner edge 29 of section 28 of seal 20 engages the outer cylindrical wall 82 of conduit 80 to seal the connection of conduit 80 to insert assembly 10. When the insert 10 is installed, the ring seal 20 is under compression to provide a seat between the socket 92 and conduit 80.

When the insert 10 is installed, the tips 47 of outwardly extending tines 46 of gripping ring 40 dig into and engage the inner cylindrical surface 94 of socket 92, and shoulder 59 of second cartridge 50 engages the outer annular rim 96 of the socket 92. The tips 45 of inwardly extending tines 44 of gripping ring 40 engage the outer cylindrical wall 82 of the conduit to hold it in place. The release ring 60 including its tapered surface 65 is in the position shown in FIG. 5, allowing the gripping ring 40 to hold the conduit 80 within fitting 90. As can be seen in FIG. 5, if the release ring 60 is moved to the left (in the direction of arrow B), the tapered surface 65 will engage tines 44, urging them away from surface 82 of conduit 80, allowing removal of conduit 80.

The insert assembly 10, therefore, can be inserted into an open ended socket 92 of any type of plumbing fitting 90 without requiring further processing of the fitting. It is self-locking and sealing to the plumbing fitting. This greatly facilitates the use in the field for providing a push-to-connect plumbing connection for sealably and lockably inserting a conduit into a mating plumbing fitting.

It will become apparent to those skilled in the art that various modifications to the preferred embodiment of the invention as described herein can be made without departing from the spirit or scope of the invention as defined by the appended claims.

The invention claimed is:
1. A self-locking push-to-connect insert assembly for coupling plumbing components together, said plumbing components having an input socket with a cylindrical side wall terminating in an annular shoulder, said assembly comprising:

a first cartridge having generally cylindrical wall having a diameter less than the diameter of said socket and an annular surface for receiving a seal;

a gripping ring positioned adjacent and in contact with said first cartridge, said gripping ring having a washer-shaped body with inwardly projecting annularly spaced tines for gripping and holding a fluid conduit inserted into said assembly and outwardly extending annularly spaced tines on a side of said body opposite said inwardly projecting tines for engaging said cylindrical side wall of said socket for holding said assembly in a plumbing fitting;

a second generally cylindrical cartridge positioned in said housing adjacent said gripping ring on a side opposite said first cartridge, wherein said second cartridge is coupled to said first cartridge with said gripping ring held therebetween; and a washer-shaped ring seal coupled to said annular surface of said first cartridge and engaging said shoulder and cylindrical side wall of said input socket of said plumbing fitting when said assembly is inserted into said socket to seal said assembly to said fitting and form a seal between said assembly and a conduit extended into said assembly.

2. The assembly as defined in claim 1 wherein an end of said cylindrical wall of said first cartridge facing said gripping ring is beveled to provide clearance to allow said inwardly projecting tines of said gripping ring to flex.

3. A self-locking push-to-connect insert assembly for coupling plumbing components together, said assembly comprising:

a first cartridge having generally cylindrical wall;

a gripping ring positioned adjacent and in contact with said first cartridge, said gripping ring having a washer-shaped body with inwardly projecting annularly spaced tines for gripping and holding a fluid conduit inserted into said assembly and outwardly extending annularly spaced tines on a side of said body opposite said inwardly projecting tines for holding said assembly in a plumbing fitting;

a second generally cylindrical cartridge positioned in said housing adjacent said gripping ring on a side opposite said first cartridge, wherein said second cartridge is coupled to said first cartridge with said gripping ring held therebetween, wherein an end of said cylindrical wall of said first cartridge facing said gripping ring is beveled to provide clearance to allow said inwardly projecting tines of said gripping ring to flex, and wherein an end of said second cartridge facing said gripping ring is beveled to provide clearance to allow said outwardly projecting tines of said gripping ring to flex.

4. The assembly as defined in claim 3 wherein said second cartridge includes an internal annular shoulder.

5. The assembly as defined in claim 4 and further including a cylindrical release ring having a tapered end with a locking surface, said release ring inserted into said second cartridge with said locking surface engaging said internal annular shoulder of said second cartridge for retaining said release ring to said assembly.

6. The assembly as defined in claim 5 wherein said first cartridge includes a plurality of annularly spaced axially extending tabs extending from an end of said cylindrical wall opposite said beveled surface.

7. The assembly as defined in claim 6 and further including a ring seal having apertures aligned with said axially extending tabs of said first cartridge for affixing said ring seal to said first cartridge.

8. The assembly as defined in claim 7 wherein said ring seal is washer shaped.

9. The assembly as defined in claim 8 wherein said ring seal has a tapered surface on its inner diameter which is dimensioned to sealably engage a fluid conduit inserted into said assembly from a direction of said second cartridge.

10. The assembly as defined in claim 9 wherein said ring seal has an outer diameter selected to sealably engage a wall of a plumbing fitting into which said assembly is installed.

11. A self-locking push-to-connect assembly for coupling plumbing components together, said assembly comprising:

a first cartridge having a generally cylindrical wall with annularly spaced apertures which extend axially and radially through said generally cylindrical wall;

a gripping ring positioned adjacent and in contact with said first cartridge, said gripping ring having a washer-shaped body with inwardly projecting annularly spaced tines for gripping and holding a fluid conduit inserted into said assembly and outwardly extending annularly spaced tines on a side of said body opposite said inwardly projecting tines, said body including apertures aligned with said axially extending apertures of said first cartridge; and a second generally cylindrical cartridge positioned in said housing adjacent said gripping ring on a side opposite said first cartridge, wherein said second cartridge includes locking tabs aligned with said axially extending apertures of said first cartridge and extending through said apertures in said gripping ring for holding said first and second cartridges together with said gripping ring therebetween.

12. The assembly as defined in claim 11 wherein said locking tabs include a tapered end including a locking surface and wherein said tapered end extends through the radially extending section of said apertures of said first cartridge to snap-lock said first and second cartridges together.

13. The assembly as defined in claim 12 wherein an end of said cylindrical wall of said first cartridge facing said gripping ring is beveled to provide clearance to allow said inwardly projecting tines of said gripping ring to flex.

14. The assembly as defined in claim 13 wherein an end of said second cartridge facing said gripping ring is beveled to provide clearance to allow said outwardly projecting tines of said gripping ring to flex.

15. The assembly as defined in claim 14 wherein said second cartridge includes an internal annular shoulder.

16. The assembly as defined in claim 15 and further including a cylindrical release ring having a tapered end with a locking surface, said release ring inserted into said second cartridge with said locking surface engaging said internal annular shoulder of said second cartridge for retaining said release ring to said assembly.

17. The assembly as defined in claim 11 wherein said first cartridge includes a plurality of annularly spaced axially extending tabs extending from an end of said cylindrical wall opposite said second cartridge.

18. The assembly as defined in claim 17 and further Including a ring seal having apertures aligned with said axially extending tabs of said first cartridge for affixing said ring seal to said first cartridge.

19. The assembly as defined in claim 18 wherein said ring seal is washer-shaped and has an annular indentation formed in an outer surface.

20. The assembly as defined in claim 19 wherein said ring seal has a tapered surface on its inner diameter which is dimensioned to sealably engage a fluid conduit inserted into said assembly from a direction of said second cartridge.

21. The assembly as defined in claim 20 wherein said ring seal has an outer diameter selected to sealably engage a wall of a plumbing fitting into which said assembly is installed.

22. The assembly as defined in claim 11 and further comprising:
   a cylindrical release ring having a tapered end with a locking surface extending generally orthogonal to a longitudinal axis of said cylindrical ring, said release ring adapted to surround a conduit held in a plumbing fitting by said gripping ring, wherein said release ring can be moved longitudinally with said tapered end engaging said inwardly projecting tines of said gripping ring to deflect said tines to release a conduit, wherein said release ring is held in the plumbing fitting by said locking surface.

23. A plumbing fitting with a self-locking push-to-connect assembly for coupling a conduit to the plumbing fitting, said assembly comprising:
   a plumbing fitting comprising one of a T, elbow, coupling, and valve having an input socket with a cylindrical side wall terminating in an annular shoulder;
   a first cartridge having a generally cylindrical wall having a diameter less than the diameter of said socket, said cylindrical wall of said first cartridge having annularly spaced apertures which extend axially and radially through said generally cylindrical wall;
   a gripping ring positioned adjacent and in contact with said first cartridge, said gripping ring having a washer-shaped body with Inwardly projecting annularly spaced tines for gripping and holding a fluid conduit inserted into said assembly and outwardly extending annularly spaced tines on a side of said body opposite said inwardly projecting tines for engaging said cylindrical side wall of said socket, said body of said gripping ring including apertures aligned with said axially extending apertures of said first cartridge;
   a second generally cylindrical cartridge positioned in said housing adjacent said gripping ring on a side opposite said first cartridge, wherein said second cartridge includes locking tabs aligned with said axially extending apertures of said first cartridge and extending through said apertures in said gripping ring for holding said first and second cartridges together with said gripping ring therebetween; and
   a washer-shaped ring seal coupled to said first cartridge and engaging said shoulder and cylindrical side wall of said input socket of said plumbing fitting when said assembly is inserted into said socket to seal said assembly to said fitting and to form a seal between said assembly and a conduit extended into said assembly.

24. The assembly as defined in claim 23 wherein said ring seal has a tapered surface on its inner diameter which is dimensioned to sealably engage a fluid conduit inserted into said assembly from a direction of said second cartridge.

25. The assembly as defined in claim 24 wherein said ring seal has an indentation formed on an outer edge thereof.

26. The assembly as defined in claim 25 wherein said first cartridge includes a plurality of annularly spaced axially extending tabs extending from an end of said cylindrical wall opposite said beveled surface.

27. The assembly as defined in claim 26 wherein said ring seal includes apertures aligned with said axially extending tabs of said first cartridge for affixing said ring seal to said first cartridge.

28. The assembly as defined in claim 23 wherein said second cartridge includes an internal annular shoulder.

29. The assembly as defined in claim 28 and further including a cylindrical release ring having a tapered end with a locking surface, said release ring inserted into said second cartridge with said locking surface engaging said internal annular shoulder of said second cartridge for retaining said release ring to said assembly.

30. The assembly as defined in claim 23 wherein said locking tabs of said second cartridge include a tapered end including a locking surface and wherein said locking surface extends through the radially extending section of said apertures of said first cartridge to snap-lock said first and second cartridges together.

31. The assembly as defined in claim 30 wherein an end of said cylindrical wall of said first cartridge facing said gripping ring is beveled to provide clearance to allow said Inwardly projecting tines of said gripping ring to flex.

32. The assembly as defined in claim 31 wherein an end of said second cartridge facing said gripping ring is beveled to provide clearance to allow said outwardly projecting tines of said gripping ring to flex.

* * * * *